US011412311B2

(12) United States Patent
Chakraborty et al.

(10) Patent No.: US 11,412,311 B2
(45) Date of Patent: Aug. 9, 2022

(54) METHODS AND SYSTEMS FOR SAVING DATA WHILE STREAMING VIDEO

(71) Applicant: Samsung Electronics Co., Ltd., Gyeonggi-do (KR)

(72) Inventors: Prasenjit Chakraborty, Bangalore (IN); Om Prakash, Bangalore (IN); Sachin Dev, Bangalore (IN); Shweta Aggarwal, Bangalore (IN)

(73) Assignee: Samsung Electronics Co., Ltd

( * ) Notice: Subject to any disclaimer, the term of this patent is extended or adjusted under 35 U.S.C. 154(b) by 91 days.

(21) Appl. No.: 16/608,630

(22) PCT Filed: May 8, 2018

(86) PCT No.: PCT/KR2018/005289
§ 371 (c)(1),
(2) Date: Oct. 25, 2019

(87) PCT Pub. No.: WO2018/216929
PCT Pub. Date: Nov. 29, 2018

(65) Prior Publication Data
US 2021/0127180 A1 Apr. 29, 2021

(30) Foreign Application Priority Data

May 25, 2017 (IN) .................. 201741018470 PS
Feb. 5, 2018 (IN) .................. 201741018470 CS

(51) Int. Cl.
*H04N 21/845* (2011.01)
*H04N 21/2343* (2011.01)
(Continued)

(52) U.S. Cl.
CPC ... *H04N 21/8456* (2013.01); *H04N 21/23439* (2013.01); *H04N 21/2662* (2013.01); *H04N 21/433* (2013.01); *H04N 21/4402* (2013.01)

(58) Field of Classification Search
None
See application file for complete search history.

(56) References Cited

U.S. PATENT DOCUMENTS 7,961,787 B2 6/2011 Tsai et al.
8,270,473 B2 9/2012 Chen et al.
(Continued)

FOREIGN PATENT DOCUMENTS

RU 2277303 5/2006
WO WO 2015/188678 12/2015

OTHER PUBLICATIONS

PCT/ISA/210 Search Report issued on PCT/KR2018/005289, pp. 4.
(Continued)

*Primary Examiner* — Nasser M Goodarzi
*Assistant Examiner* — Terrika Peterson
(74) *Attorney, Agent, or Firm* — The Farrell Law Firm, P.C.

(57) ABSTRACT

Embodiments herein provide methods and systems for saving data while streaming a video. The embodiments include streaming a first fragment of the video at a bit-rate based on network conditions. In an embodiment, the scene content complexity of the first fragment can be analyzed while streaming the first fragment. Based on the screen complexity, the second fragment can be streamed at a bit-rate based on the network conditions and the analyzed screen complexity. In another embodiment, a second fragment can be received at a minimum possible resolution and, thereafter, the scene content complexity of the second fragment can be analyzed while streaming the first fragment. Based on the screen complexity of the second fragment, it can be streamed at a bit-rate based on the network conditions and
(Continued)

the analyzed screen complexity. There may be no perceptible difference in streamed quality of the first fragment and the second fragment.

11 Claims, 2 Drawing Sheets

(51) Int. Cl.
    *H04N 21/2662*     (2011.01)
    *H04N 21/433*     (2011.01)
    *H04N 21/4402*     (2011.01)

(56) References Cited

U.S. PATENT DOCUMENTS

| | | |
|---|---|---|
| 8,997,160 B2 | 3/2015 | Hunt |
| 9,060,207 B2 | 6/2015 | Scherkus et al. |
| 2005/0033879 A1 | 2/2005 | Hwang et al. |
| 2009/0144792 A1* | 6/2009 | Fielibert ............ H04N 21/4344 725/116 |
| 2009/0300203 A1* | 12/2009 | Virdi ................ H04N 21/44004 709/231 |
| 2009/0328124 A1* | 12/2009 | Khouzam ...... H04N 21/234354 725/116 |
| 2013/0128955 A1* | 5/2013 | Chen .................... H04N 19/149 375/240.02 |
| 2014/0201324 A1 | 7/2014 | Zhang et al. |
| 2015/0023404 A1 | 1/2015 | Li et al. |
| 2015/0134770 A1 | 5/2015 | Heinz, II et al. |
| 2015/0350726 A1 | 12/2015 | Tan |
| 2016/0275357 A1* | 9/2016 | Gino ..................... G06T 3/0006 |
| 2017/0055012 A1 | 2/2017 | Phillips et al. |
| 2018/0205778 A1* | 7/2018 | Forman ................ H04L 65/608 |

OTHER PUBLICATIONS

PCT/ISA/237 Written Opinion issued on PCT/KR2018/005289, pp. 6.

Indian Examination Report dated Jan. 27, 2021 issued in counterpart application No. 201741018470, 6 pages.

* cited by examiner

[Fig. 1]
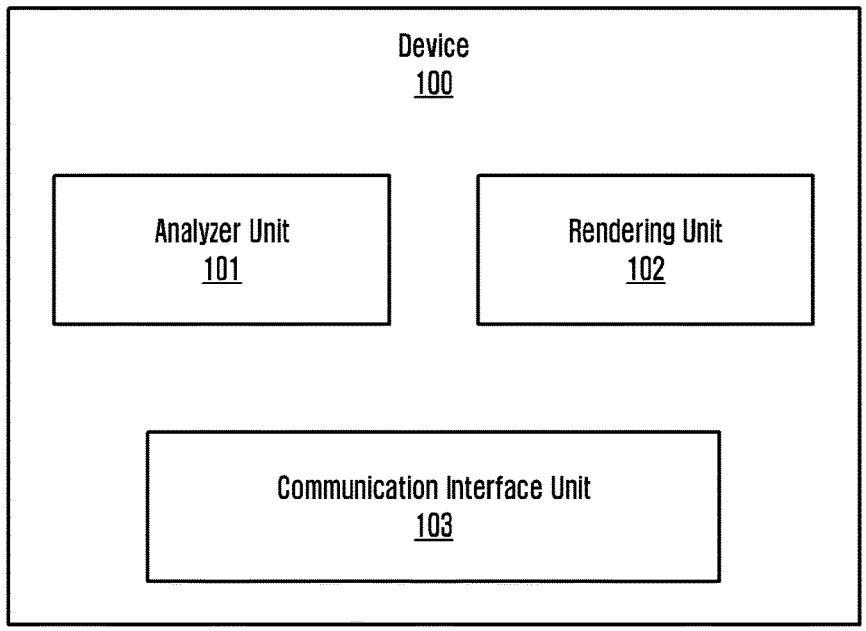
[Fig. 2]
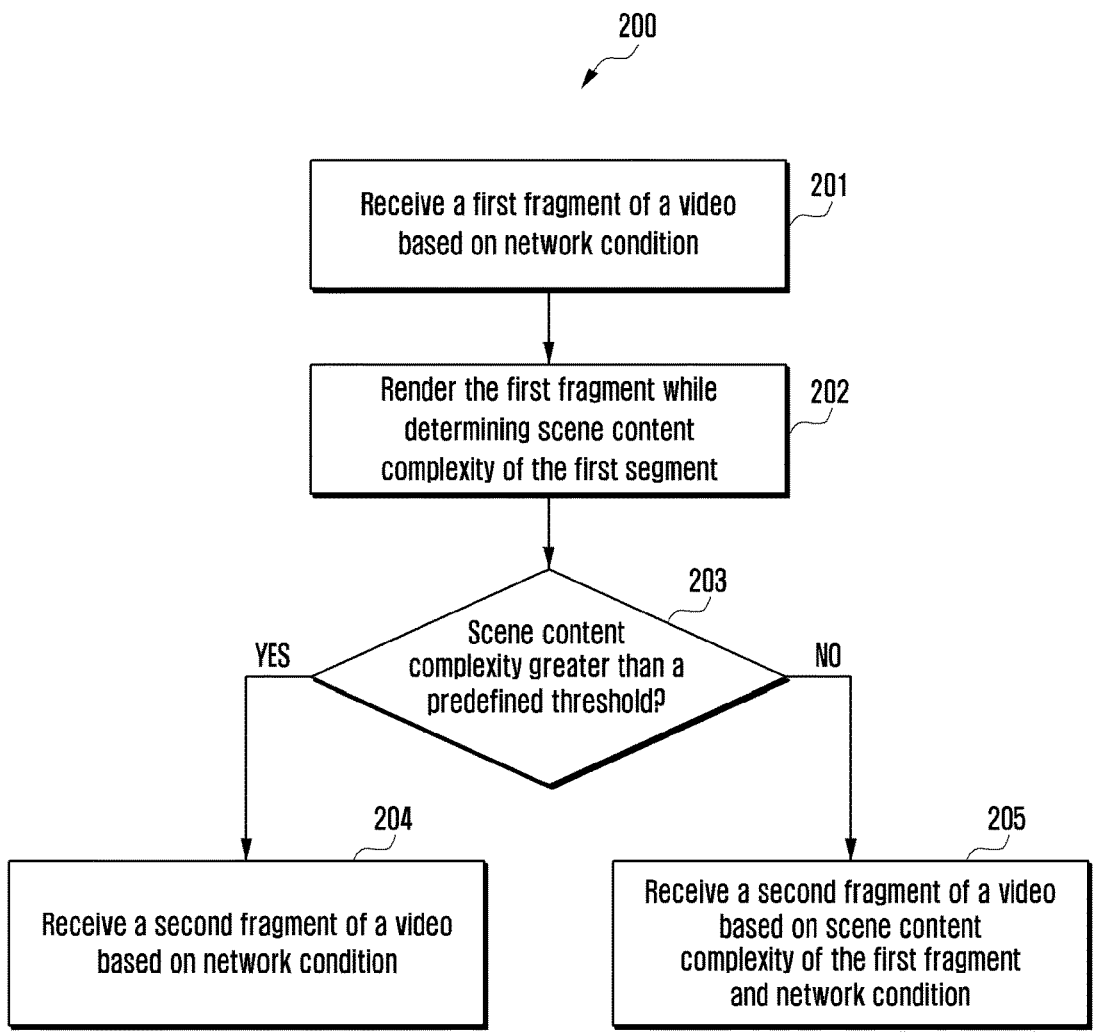

[Fig. 3]
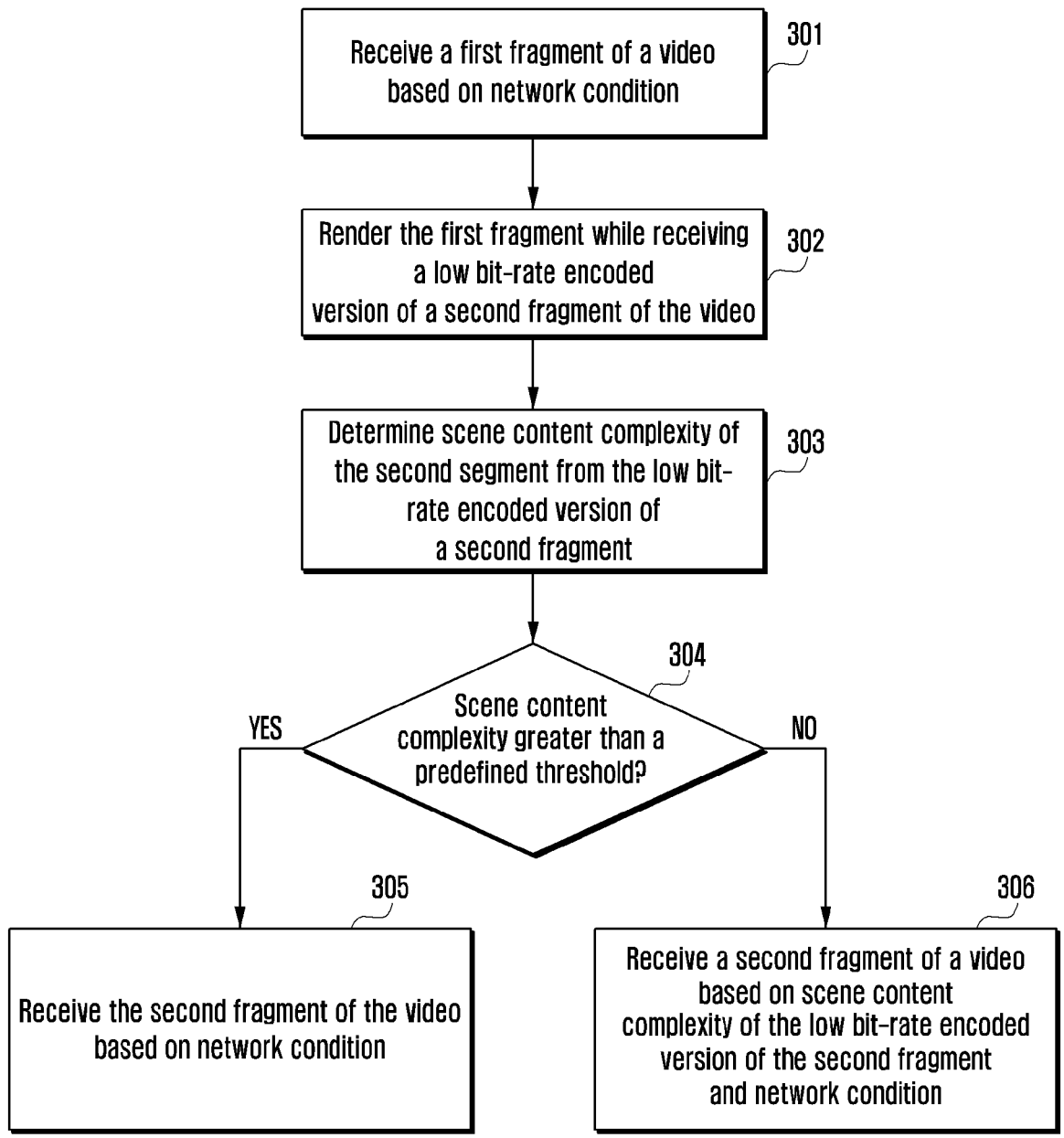

METHODS AND SYSTEMS FOR SAVING DATA WHILE STREAMING VIDEO

PRIORITY

This application is a National Phase Entry of PCT International Application No. PCT/KR2018/005289 which was filed on May 8, 2018, and claims priority to Indian Provisional Patent Application No. 201741018470 PS, which was filed May 25, 2017, and Indian Complete Patent Application No. 201741018470 CS, which was filed on Feb. 5, 2018, the content of each of which is incorporated herein by reference.

TECHNICAL FIELD

Embodiments herein relate to video streaming, and more particularly to methods and systems for saving data while streaming a video.

BACKGROUND ART

Currently, screens of devices such as mobile phones are increasing. The users can also use such devices for accessing media, such as videos. In general, the videos are not stored locally and can be accessed by the user using streaming services.

As the screen size of a device increases and the quality of the video improves, it may be difficult to view basic pixel structure of the device. The screen of the device can include a grid structure, formed of spaces between pixels. The grid structure can be visible to a user if the user views the screen from a close distance. The existence of the grid structure may not be discernible in devices with smaller screens. For HD and full-HD videos, there may not be any discernible difference at a normal watching distance (distance between eye of the user and screen of the device), in case there is not much motion or change in the screen content occurring in subsequent frames, given a low or medium sized device.

Perceivable video quality for a low complexity scene (screen content, in which there is no significant or drastic pixel variation due to motion or texture) may be same for both HD and full-HD version of a video. As such, for a low complexity scene, playing the video in the HD or full-HD may not lead to an appreciable enhancement in visual experience of the user, as long as display or screen size of the device is not on the higher side. Conversely though, streaming the HD or the full-HD version of the video consumes almost a significantly larger amount of data, as compared to streaming the video at a lower definition.

In order to stream a video without buffering, which may occur due to network conditions, an Adaptive Bit-Rate (ABR) policy can be used. The ABR policy allows ABR content switch, wherein a bit-rate, at which a fragment of the video, encoded at different bitrates, is streamed, can be switched. The switching may depend on the network conditions. The device (client) streaming the video can switch between different qualities, at which the fragments can be streamed, by downloading the fragment encoded at a particular bit-rate based on device logic or default ABR policy. However, switching the quality, at which the fragment is streamed, based on only the network conditions may not lead to appreciable data saving. This is due to the fact that there may not be appreciable visual enhancement experience while viewing a low complexity scene of the video at higher bit-rates, even if network conditions are optimum.

There are data saving methods, which allow streaming of the video at the lowest quality, in order to save data. When a data saving method is enabled, the lowest resolution of the video is automatically selected, regardless of network conditions. This can enable maximum data saving, but at the cost of a degraded user experience.

DISCLOSURE OF INVENTION

Technical Problem

The principal object of the embodiments herein is to disclose methods and systems for saving data while streaming a video.

Another object of the embodiments herein is to analyze complexity of frames, based on texture and motion, of a displayed fragment of the video, in order to download a subsequent fragment of the video for streaming at a certain quality.

Another object of the embodiments herein is to analyze the complexity of the frames of the displayed fragment by comparing similarity of content, between the frames of the displayed fragment.

Another object of the embodiments herein is to download the subsequent fragment at a certain quality based on the analyzed complexity of the frames of the displayed fragment, such that there is no perceivable difference, in quality, between the frames of the displayed fragment and the subsequent fragment.

Solution to Problem

Accordingly the embodiments provide methods and systems for saving data while streaming a video. The embodiments include streaming a first fragment of the video at a bit-rate based on network conditions. In an embodiment, the scene content complexity of the first fragment can be analyzed while streaming the first fragment. Based on the screen complexity, the second fragment can be streamed at a bit-rate based on the network conditions and the analyzed screen complexity.

In another embodiment, a second fragment can be received at a minimum possible resolution and, thereafter, the scene content complexity of the second fragment can be analyzed while streaming the first fragment. Based on the screen complexity of the second fragment, it can be streamed at a bit-rate based on the network conditions and the analyzed screen complexity. There may be no perceptible difference in streamed quality of the first fragment and the second fragment.

Advantageous Effects of Invention

According to various embodiments of the present invention, the present invention can save data without reducing user perceived video quality.

According to various embodiment of the present invention, the present invention can provide maximum data saving without content quality degradation.

BRIEF DESCRIPTION OF DRAWINGS

FIG. 1 depicts various units of a device which can save data while streaming a video, according to embodiments as disclosed herein;

FIG. 2 is a flowchart depicting a method of saving data while streaming the video, according to embodiments as disclosed herein; and FIG. 3 a flowchart depicting another method of saving data while streaming the video, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for saving data while streaming a video. The embodiments include streaming a first fragment of the video at a bit-rate based on network conditions or an Adaptive Bit-Rate (ABR) streaming policy.

In an embodiment, scene content complexity of the first fragment can be determined while streaming the first fragment. Based on the determined screen complexity, the second fragment can be either streamed at the bit-rate based on the network conditions or the ABR policy; or the second fragment can be streamed at a bit-rate based on the network conditions and the analyzed screen complexity of the first fragment.

In an embodiment, a second fragment can be received and scene content complexity of the second fragment can be determined, while streaming the first fragment. The resolution or bit-rate of the received second fragment can be low, in order to ensure that data loss is minimum. Based on the determined screen complexity of the low resolution second fragment, the second fragment can be either streamed at the bit-rate based on either the network conditions or the ABR policy; or the second fragment can be streamed at a bit-rate based on the network conditions and the analyzed screen complexity of the low resolution second fragment.

The bit-rate based on the network conditions and the analyzed screen complexity, at which the second fragment is streamed, may be such that there is no difference in rendered quality of the first fragment and the second fragment; which is perceivable to a viewer. If there is a perceived difference in quality between the rendered first fragment and the second fragment, then the embodiments can receive a third fragment with the lowest resolution and analyze scene content complexity of the third fragment while streaming the second fragment. Thereafter the third fragment can be streamed at a bit-rate such as there is no perceivable difference in quality between the streamed second fragment and the third fragment.

Referring now to the drawings, and more particularly to FIGS. 1 through 3, where similar reference characters denote corresponding features consistently throughout the figures, there are shown preferred embodiments.

FIG. 1 depicts various units of a device 100, which can save data while streaming a video, according to embodiments as disclosed herein. The device 100 can be, but not limited to, a smart phone, a tablet, a desktop, a laptop, a PC, and so on. The device 100 is capable of streaming videos and can include an analyzer unit 101, a rendering unit 102, and a communication interface unit 103. The analyzer unit 101 can analyze fragments of a video to determine scene content complexity of the fragments of the video. The rendering unit 102 can stream the fragments of the video at a determined bit-rate based on network conditions and/or determined scene content complexity. The communication interface unit 103 can receive the fragments of the video to be analyzed or streamed.

In an embodiment, consider that a video is to be streamed on the screen of the device 100. The video can be received in a plurality of fragments. Each of the plurality of fragments can be encoded at different bit-rates. The communication interface unit 103 can receive a particular encoded version of each of the fragments based on at least one of ABR policy, network condition and scene content complexity of a fragment previous to the fragment to be streamed. The communication interface unit 103 can receive a first fragment of the video based on network conditions and ABR policy. The analyzer unit 101 can obtain the first fragment of the video for determining scene content complexity of the first fragment. The rendering unit 102 can stream (render) the first fragment, while the analyzer unit 101 can determine the scene content complexity of the first fragment. Based on the determined scene content complexity of the first fragment, the analyzer unit 101 can indicate to the communication interface unit 103 to fetch the second fragment of the video encoded at a particular bit-rate, such that there is no perceivable difference in quality between the streamed first fragment and the second fragment. The communication interface unit 103 can consider at least one of the network conditions, and the scene content complexity of the first fragment and the network conditions; in order to receive the particular encoded version of the second fragment. The rendering unit 102 can thereafter stream (render) the particular encoded version of the second fragment of the video. Thus, the choice of streaming a particular encoded version of a video fragment can be based on the network conditions and/or scene content complexity of the previous video fragment.

In an embodiment, a fragment can comprises a part of a plurality of frames included in the video. The second fragment can comprises a plurality of frames following a plurality of frames included in the first fragment.

In an embodiment, the analyzer unit 101 and the rendering unit 102 can be elements being implemented on a processor of the electronic device 100. The communication interface unit 103 can be controlled by the processor of the electronic device 100.

In another embodiment, consider that a video is to be streamed on the screen of the device 100. The communication interface unit 103 can receive an encoded first fragment of the video based on ABR policy and network conditions. The rendering unit 102 can stream the first fragment of the video. The communication interface unit 103 can also receive the second fragment of the video, which is encoded at the lowest possible bit-rate while the rendering unit 102 streams the first fragment of the video. The analyzer unit 101 can obtain the second fragment of the video, encoded at the lowest possible bit-rate, for determining scene content complexity of the second fragment of the video. Based on the determined scene content complexity of the second fragment, the analyzer unit 101 can control the communication interface unit 103 to receive the second fragment of the video encoded at the particular bit-rate such that a viewer cannot perceive a difference in quality between the rendered first fragment and the second fragment. The communication interface unit 103 can also take into account at least one of the network conditions and the determined scene content complexity of the second fragment encoded at the lowest possible bit-rate, prior to receiving the particular encoded version of the second fragment, for streaming by the rendering unit 102. Thus, the embodiments include receiving a low bit-rate encoded version of a fragment to determine its scene content complexity, prior to streaming an appropriate encoded version of the fragment. The scene content complexity of the fragment can be analyzed using the lowest bit-rate encoded version of the fragment, while the previous fragment is streamed.

FIG. 1 shows exemplary units of the device 100, but it is to be understood that other embodiments are not limited thereon. In other embodiments, the device 100 may include less or more number of units. Further, the labels or names of the units are used only for illustrative purpose and does not limit the scope of the invention. One or more units can be combined together to perform same or substantially similar function in the device 100.

FIG. 2 is a flowchart 200 depicting a method of saving data while streaming the video, according to embodiments as disclosed herein. In an example, consider that a video comprising of a plurality of fragments, with each fragment encoded at different bit-rates, is to be streamed. At step 201, the method includes receiving, by the communication interface unit 103, a first fragment of the video, encoded at a particular bit-rate. The particular encoded version of the first fragment can be received based on ABR policy and at least one network condition.

At step 202, the method includes rendering, by the rendering unit 102, the first fragment while determining scene content complexity of the first fragment. The analyzer unit 101 can obtain the first fragment of the video for determining scene content complexity of the first fragment. The scene content complexity can be determined using Multi-scale Structural Similarity (MSSIM) index, Structural Similarity (SSIM) index, Peak Signal to Noise Ratio (PSNR), and so on. The SSIM index can measure the similarity between frames of a fragment of the video, which is consistent with Human Visual System (HVS). The MSSIM index can be performed in a plurality of scales through a plurality of stages of sub-sampling.

In an embodiment, the analyzer unit 101 can determine the scene content complexity using a Mean Structural Similarity (MSSIM) index. The MSSIM index can be obtained by comparing scene content of frames of the first fragment. In an example, scene content of a first frame of the first fragment can be compared with scene content of a tenth frame of the first fragment. Similarly, scene content of the tenth frame can be compared with scene content a twentieth frame, and so on. The embodiments can compare scene content of consecutive frames. However, comparing frames consecutive frames may increase latency and computational complexity.

Based on such comparisons, the MSSIM index can be obtained, which can provide the degree of similarity between the frames. The MSSIM index can be close to 1, if the scene content is similar. On the other hand, if the scene content is dissimilar, then the MSSIM can be close to −1. It can be concluded that scene content complexity of a fragment correlates with similarity and dissimilarity between the frames of the fragment. The rendering unit 102 can stream (render) the first fragment, while the analyzer unit 101 is determining the scene content complexity of the first fragment.

At step 203, the method includes determining whether the scene content complexity of the first fragment is greater than a predefined threshold. The scene content complexity may be due to motion of scene contents, texture characteristics, and so on, in the frames. Based on motion, texture characteristics, and so on, of the frames of the first fragment, the analyzer unit 101 can determine whether the scene content complexity exceeds the predefined threshold. The predefined threshold can be based on information of motion or texture characteristics, present in the scene content of the first fragment. This information can be used for predicting the scene content complexity of the second fragment and selecting an encoded version of the second version such that there is no perceivable difference in streamed quality between the first fragment and the second fragment. The degree of scene content complexity can be based on presence of motion or texture variation in scene content of the frames in the first fragment. Thereafter, the analyzer unit 101 can direct the communication interface unit 103 to receive a particular encoded version of a second fragment of the video. It can be noted that the second fragment is successive to the first fragment.

At step 204, the method includes receiving the second fragment of the video based on at least one network condition, in response to determining that the scene content complexity of the first fragment is greater than the predefined threshold. Thus, the embodiments include predicting the scene content complexity of the second fragment based on the scene content complexity of the first fragment. While the second fragment is being rendered by the rendering unit 102, the scene content complexity of the second fragment can be determined by the analyzer unit 101 in parallel. Based on the determined scene content complexity of the second fragment, the analyzer unit 101 can indicate the communication interface unit 103 to receive the third fragment of the video, encoded at a particular bit-rate. The sequence of steps can continue until all the fragments of the video are received and rendered (streamed).

At step 205, the method includes receiving the second fragment of the video based on network condition and the determined scene content complexity of the first fragment, in response to determining that the scene content complexity of the first fragment is less than the predefined threshold. It can be inferred that the parameters, which may contribute to the scene content complexity, such as motion, texture characteristics, and so on, in the frames of the first fragment is less. As such, the rendering unit 102 can render a version of the second fragment, which is encoded at a lower bit-rate compared to the bit-rate at which the rendered first fragment is encoded. The viewer may not be able to perceive a difference in the quality between the rendered second fragment and the first fragment.

In an embodiment of this invention, the method includes receiving the second fragment of the video with current video quality. the current video quality is same with a quality of the first fragment.

The perceived quality of fragments, with different motion and texture characteristics, can significantly vary with variation of bit rates at which the fragments are encoded. The HVS can perceive a difference in streamed quality (bit-rate) between the streamed fragments, if there is significant pixel variation between the frames due to motion and/or complex texture characteristics of the frames. On the other hand, if there is less pixel variation between the frames due to less motion and/or the texture characteristics in the frames are simple, then the HVS cannot perceive switching from high stream quality to low stream quality between fragments.

The analyzer unit 101 can determine the scene content complexity of the second fragment while the second fragment is rendered. Based on the determined scene content complexity, the version of the third fragment encoded at a particular bit-rate is rendered. The embodiments can utilize the scene content complexity of the second fragment to determine whether the bit-rate at which the second fragment is rendered, is accurate. As the bit-rate, at which the second fragment is rendered, is chosen based on the scene content complexity of the first fragment, the bit-rate may not be accurate.

The inaccuracy can be deduced based on affirmation of the following two conditions, viz., the scene content complexity of the first fragment is greater than the predefined threshold and the scene content complexity of the second fragment is less than the predefined threshold; and the scene content complexity of the first fragment is less than the predefined threshold and the scene content complexity of the second fragment is greater than the predefined threshold.

If it is determined that the bit-rate, at which the second fragment is rendered, is in-accurate, then the embodiments can attempt to detect similar inaccuracies for a predefined number of fragments. If the inaccuracies increase than the embodiments can, while rendering a fragment at a particular bit-rate can receive a version of a subsequent fragment, encoded at a minimum bit-rate, to determine the scene content complexity of the subsequent fragment prior to rendering the subsequent fragment.

The various actions in method may be performed in the order presented, in a different order or simultaneously. Further, in some embodiments, some actions listed in FIG. 2 may be omitted.

FIG. 3 a flowchart 300 depicting another method of saving data while streaming the video, according to embodiments as disclosed herein. In an example, consider that the video is to be streamed on the screen of the device 100. At step 301, the method includes receiving, by the communication interface unit 103, a first fragment of the video, encoded at a particular bit-rate, based on network condition and/or ABR policy. At step 302, the method includes receiving, by the communication interface unit 103, a version of a second fragment of the video, which is encoded at the lowest possible bit-rate. The second fragment of the video can be received while the rendering unit 102 can stream the first fragment of the video.

At step 303, the method includes determining the scene content complexity of the second fragment from the received second fragment, encoded at the lowest possible bit-rate. The analyzer unit 101 can obtain the second fragment of the video, encoded at the lowest possible bit-rate, for determining scene content complexity of the second fragment of the video. Meanwhile, the rendering unit 102 can stream the first fragment, while the scene content complexity of the second fragment is determined by the analyzer unit 101.

In an embodiment of this invention, the analyzer unit 101 can determine the complexity between the frame included in the first fragment and the frame included in the second fragment. According to another embodiment, the analyzer unit 101 can determine the complexity by comparing the average complexity of the frames included in the first fragment with the average complexity of the frames included in the second fragment.

At step 304, the method includes determining whether the scene content complexity of the second fragment is greater than the predefined threshold. The scene content complexity may be due to motion of scene contents and texture characteristics of the frames of the second fragment. Based on motion and texture characteristics of the frames of the second fragment, the analyzer unit 101 can determine whether the scene content complexity exceeds the predefined threshold. Thereafter, the analyzer unit 101 can direct the communication interface unit 103 to receive a particular encoded version of a second fragment of the video such that there is no perceivable difference in quality between the rendered second fragment and the first fragment.

In an embodiment, for determining scene content complexity of the second fragment, from the received lowest bit-rate encoded version of the second fragment, frames of the second fragment can be compared with each other. The compared parameter can be structural similarity between the frames. In an example, the structural similarity between the first frame and the tenth fragment can be determined. The determined structural similarity can be used for ascertaining the scene content complexity of the frames of the second fragment.

At step 305, the method includes receiving the second fragment of the video based on network condition, in response to determining that the scene content complexity of the second fragment is greater than the predefined threshold. It can be concluded that the scene content complexity of the second fragment is equal to, if not greater than, the scene content complexity of the first fragment. The analyzer unit 101 can indicate the communication interface unit 103 to receive a version of second fragment of the video encoded at a bit-rate, higher than or equal to the bit-rate at which the rendered first fragment version is encoded. Thus, the embodiments include receiving a low bit-rate encoded version of the second fragment for determining its scene content complexity, prior to streaming the appropriate encoded version of the second fragment.

At step 306, the method includes receiving a version of the second fragment of the video encoded at a bit-rate based on network condition and the determined scene content complexity of the lowest bit-rate encoded version of the second fragment, in response to determining that the scene content complexity of the second fragment is less than the predefined threshold. As such, the rendering unit 102 can render a version of the second fragment such that the viewer may not be able to perceive a difference in the quality between the rendered second fragment and the first fragment.

Similarly, while the second fragment is rendered, the embodiments include receiving the lowest bit-rate encoded version of the third fragment to determine scene content complexity of the third fragment. This continues, until all the fragments of the video have been rendered.

While the second fragment is rendered, scene content complexity of a third fragment version, encoded with a minimum bit-rate, can be determined. The embodiments can obtain variation of scene content complexity (greater than or less than the predefined threshold) over a predefined number of fragments. If the variation of the scene content complexity is fairly consistent, the embodiments can determine the scene content complexity of a fragment, which is rendered currently. The scene content complexity of the fragment can be utilized for obtaining a version of the subsequent fragment, encoded at a particular bit-rate. This allows saving data since, a low bit-rate version of the subsequent fragment need not be received.

In another embodiment of this invention, the second fragment used at Step 303 can be rendered without newly downloading the second fragment at Step 306, in response to in response to determining that the scene content complexity of the second fragment is less than the predefined threshold.

The various actions in method may be performed in the order presented, in a different order or simultaneously. Further, in some embodiments, some actions listed in FIG. 3 may be omitted.

In an example, considering a user is streaming a video on the screen of the device 100. The video can comprise of multiple fragments, in which each fragment can have four versions, encoded at different bit-rates. The quality of the four versions can be referred to as low, medium, high-medium and high, in which the bit-rate at which the four versions are encoded increase from lower to higher.

TABLE 1

| Content Quality | Fragment Size | Video Resolution | Overall Bit-rate |
|---|---|---|---|
| Low | 211 KB | 320 × 184 | 173 kb/s |
| Medium | 358 KB | 512 × 288 | 294 kb/s |
| High-Medium | 578 KB | 848 × 480 | 476 kb/s |
| High | 1.26 MB | 1280 × 720 | 1064 kb/s |

As depicted in table 1, the size and resolution of the different versions of a fragment increase with increase in encoded bit-rate. The embodiments attempt to minimize data consumption by streaming the fragment at a quality, wherein the viewer may not be able to detect difference in quality between the streamed fragment and a fragment previous and/or successive to the streamed fragment. If the embodiments detect that scene content complexity, of a currently streamed fragment or a lowest bit-rate encoded version of a fragment, to be streamed, is less than the predefined threshold, then the embodiments include switching to receive a version of the fragment, to be streamed, which is encoded at a bit-rate lower in comparison to the bit-rate with which the current streamed fragment is encoded with. This enables saving of data.

Consider that the video is of 10-second duration, in which there are 30 frames per second. Considering that the embodiments (analyzer unit 101) detect negligible motion and low texture characteristics in a fragment of the video streamed currently. It can be assumed that the fragment, streamed currently, is of high quality. Even if the network conditions are optimum and allow streaming a subsequent fragment in high quality, the embodiments include switching to high-medium quality to stream the subsequent fragment. The embodiments ensure that the viewer is not able to detect any perceivable change in quality in the fragment streamed currently in comparison to the fragment streamed previously. From table 1 it can be inferred that about 588 KB (1064 KB-476 KB) of data can be saved per second. However, if the embodiments detect high motion and texture characteristics in the fragment of the video streamed currently, then the subsequent fragment is rendered in high quality.

The term 'first fragment' used in the description may or may not be the first fragment of the video. The 'first fragment' can be an intermediate fragment of the video. The 'second fragment' can be a subsequent fragment to the 'first fragment'.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for saving data while streaming a video. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An electronic device for streaming a video, the electronic device comprising:
a display configured to display the video;
a communication module; and
at least one processor configured to:
in response to determining that a network condition satisfies an optimal condition, determine a scene content complexity of a first fragment of the video while the at least one processor is rendering the first fragment of the video at a bit-rate based on the network condition,
compare the scene content complexity of the first fragment with a predetermined threshold,
determine to download a second fragment of the video at the same bit-rate as the first fragment, in response to determining that the scene content complexity of the first fragment is less than the predetermined threshold and the network condition satisfies the optimal condition, and
determine to download the second fragment of the video at a lower bit-rate than the bit-rate of the first fragment in response to determining that the scene content complexity of the first fragment is less than the predetermined threshold and the network condition satisfies the optimal condition.

2. The electronic device of claim 1, wherein the at least one processor is further configured to:

control the communication module to download the second fragment while the at least one processor is rendering the first fragment of the video at a bit-rate based on the network condition;
determine a scene content complexity of the second fragment of the video;
compare the scene content complexity of the first fragment with the predetermined threshold; and
determine a bit-rate of the second fragment of the video to be re-downloaded based on the comparison result.

3. The electronic device of claim 2, wherein the at least one processor is further configured to render the downloaded second fragment of the video in response to determining that the scene content complexity of the first fragment is less than the predetermined threshold.

4. The electronic device of claim 1, wherein the optimal condition includes a condition that the network condition measured in a first period of rendering the first fragment is better than the network condition measured in a second period, the second period being earlier than the first period.

5. The electronic device of claim 1, wherein the scene content complexity of the first fragment is determined based on one of multi-scale structural similarity (MSSIM), a structural similarity (SSIM) index, and a peak signal to noise ratio (PSNR).

6. The electronic device of claim 5, wherein the MSSIM is obtained by comparing scene content of a first frame of the first fragment with scene content of at least one frame of the first fragment, wherein the at least one frame is previous or subsequent to the first frame.

7. A method of streaming a video, the method comprising:
in response to determining that a network condition satisfies an optimal condition, determining, by at least one processor, a scene content complexity of a first fragment of the video while the at least one processor is rendering the first fragment of the video at a bit-rate based on the network condition;
comparing, by the at least one processor, the scene content complexity of the first fragment with a predetermined threshold;
determining to download a second fragment of the video at the same bit-rate as the first fragment, in response to determining that the scene content complexity of the first fragment is less than the predetermined threshold and the network condition satisfies the optimal condition, and
determining to download the second fragment of the video at a lower bit-rate than the bit-rate of the first fragment in response to determining that the scene content complexity of the first fragment is less than the predetermined threshold and the network condition satisfies the optimal condition.

8. The method of claim 7, further comprising:
downloading the second fragment while the at least one processor is rendering the first fragment of the video at a bit-rate based on the network condition;
determining a scene content complexity of the second fragment of the video;
comparing the scene content complexity of the first fragment with the predetermined threshold; and
determining a bit-rate of the second fragment of the video to be re-downloaded based on the comparison result.

9. The method of claim 8, further comprising:
in response to determining that the scene content complexity of the first fragment is less than the predetermined threshold, rendering, by the at least one processor, the downloaded second fragment of the video.

10. The method of claim 7, wherein the optimal condition includes a condition that the network condition measured in a first period of rendering the first fragment is better than the network condition measured in a second period, the second period being earlier than the first period.

11. The method of claim 7, wherein the scene content complexity of the first fragment is determined, by the at least one processor, based on one of multi-scale structural similarity (MSSIM), a structural similarity (SSIM) index, and a peak signal to noise ratio (PSNR).

* * * * *